United States Patent Office 2,719,847
Patented Oct. 4, 1955

2,719,847

SUBSTITUTED 1-BENZYL-2-METHYL-OCTAHYDROISOQUINOLINES AND SALTS THEREOF

Andre Grüssner, Basel, Switzerland, assignor to Hoffmann-La Roche Inc., Nutley, N. J., a corporation of New Jersey No Drawing. Application December 17, 1951,
Serial No. 266,455

Claims priority, application Switzerland December 6, 1948

10 Claims. (Cl. 260—283)

The present invention relates to a new method for preparation of 3-hydroxy-N-methyl-morphinan which is a powerful analgesic disclosed and claimed in copending application Ser. No. 773,934, filed September 13, 1947, now matured into Patent 2,524,855, granted October 10, 1950. The invention also embraces novel intermediates which are useful in the new method just referred to.

The new method provided by the invention for the preparation of 3-hydroxy-N-methyl-morphinan may be illustrated by the following scheme of reactions:

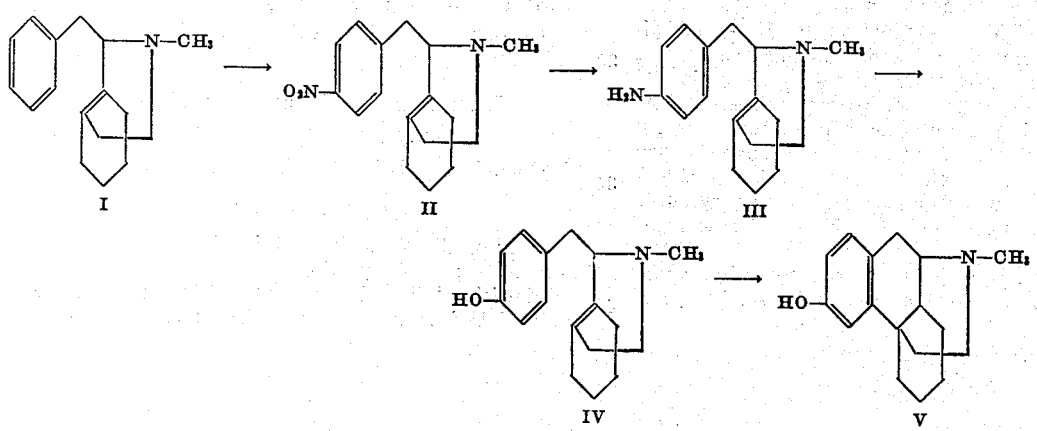

According to this new method 1-benzyl-2-methyl-1,2,3,4,5,6,7,8-octahydroisoquinoline (I) ("Naturwissenschaften," vol. 33, page 333, year 1946) is reacted with a nitrating agent, such as nitric acid, thus yielding 1-(p-nitro-benzyl) - 2 - methyl - 1,2,3,4,5,6,7,8-octahydroisoquinoline (II) as a difficultly soluble nitrate. In order to facilitate the subsequent hydrogenation, the nitrate is suitably converted into the free base or a salt more easily soluble, such as the hydrobromide. The free base or the salt obtained is then reduced, e. g., by catalytic hydrogenation into 1-(p-amino-benzyl)-2-methyl-1,2,3,4,5,6,7,8-octahydroisoquinoline or, respectively, an acid salt thereof (III). Upon diazotization of this compound III and hydrolysis of the diazo compound formed, the 1-(p-hydroxy-benzyl) - 2 - methyl-1,2,3,4,5,6,7,8-octahydroisoquinoline (IV) is obtained. This compound may be reacted with an acid to form acid salts. Upon heating together with an acid cyclizing agent, more particularly with phosphoric acid or hydrobromic acid, the hydroxy compound IV is converted into the corresponding salt of 3-hydroxy-N-methyl-morphinan (V). From the salt thus obtained, the free base or other salts may be prepared in a manner known per se.

The novel intermediates referred to above, which are embraced within the scope of the present invention, are 1-(p-amino-benzyl)-2-methyl-1,2,3,4,5,6,7,8 - octahydroisoquinoline, 1 - (p-hydroxy-benzyl)-2-methyl-1,2,3,4,5,-6,7,8-octahydroisoquinoline and the acid salts thereof, such as the nitrate, the hydrobromide, the hydrochloride, the sulfate and the like.

*Example 1*

174 parts by weight of 1-benzyl-2-methyl-1,2,3,4,5,-6,7,8-octahydroisoquinoline are dissolved in 290 parts by volume of acetic acid, and this solution is slowly added dropwise at 0° C. into a mixture of 866 parts by volume of 100 per cent nitric acid and 580 parts by volume of acetic acid. After standing for 15 hours in an ice-box, 5000 parts by volume of water are added with cooling. The nitrate which crystallizes is filtered off by suction and washed with water. Melting point 196–197° C.

The nitrate is suspended in water and to this suspension is added a solution of an alkali hydroxide until the solution is distinctly alkaline. The base which precipitates is taken up in ether, the ether solution is separated, washed thoroughly with water, dried and evaporated. The residue is dissolved in methanol and 40 per cent hydrobromic acid is added until the reaction is distinctly congo. The crystals which separate consist of 1-(p-nitro-benzyl) - 2 - methyl-1,2,3,4,5,6,7,8-octahydroisoquinoline-hydrobromide. The melting point of this salt lies at 190–193° C.

132 parts by weight of 1-(p-nitro-benzyl)-2-methyl-1,2,3,4,5,6,7,8-octahydroisoquinoline - hydrobromide in 1100 parts by volume of methanol are hydrogenated under normal or slightly elevated pressure in the presence of 130 parts by weight of palladium charcoal (1.3 parts by weight of palladium metal). After being separated from the catalyst, the solution is concentrated, whereupon the hydrobromide of 1-(p-amino-benzyl)-2-methyl-1,2,3,4,5,6,7,8-octahydroisoquinoline crystallizes. After recrystallization from methanol-ether, its melting point lies at 216–218° C.

62 parts by weight of 1-(p-amino-benzyl-2-methyl-1,2,3,4,5,6,7,8-octahydroisoquinoline-hydrobromide are dissolved in 453 parts by volume of 3n sulfuric acid. The solution is diazotized at 0–5° C. by means of a solution of 12.8 parts by weight of sodium nitrate in 100 parts by volume of water. The ice-cold diazo solution is poured within 20 minutes with stirring into a mixture of 300 parts by volume of concentrated sulfuric acid and 300 parts by volume of water, the operation being conducted at 80° C. After completion of the evolution of nitrogen, ice is added to the cooled solution. The latter is adjusted to a weakly alkaline reaction by means of about 1100 parts by volume of concentrated ammonium hydroxide. It is extracted with benzene, and the benzene solution is evaporated in vacuo. The residue is taken up in 200 parts by volume of alcohol, the solution formed is adjusted to a weak congo acid reaction by the addition of about 20 parts by volume of 48 per cent hydrobromic acid and thereto 150 parts by volume of ether are added. The crystals which precipitate are sucked off and washed with a mixture of acetone-alcohol 4:1. Melting point 243–246° C. The free base of the 1-(p-hydroxy-benzyl)-2-methyl-1,2,3,4,5,6,7,8 - octahydro-isoquinoline-hydrobromide can be obtained by making an aqueous solution of the hydrobromide distinctly alkaline, extracting the base with methanol and evaporating the solvent. The free base melts at 113° C.

30 parts by weight of 1-(p-hydroxy-benzyl)-2-methyl-1,2,3,4,5,6,7,8-octahydroisoquinoline are heated for 72 hours at 145° C. with 120 parts by volume of 100 per cent phosphoric acid. After cooling down, a mixture of 300 parts by volume of water and 300 parts by volume of concentrated hydrochloric acid are poured into and the whole is boiled under reflux for 4 hours so as to hydrolize the phosphoric acid esters which might have been formed. The solution is treated with charcoal and filtered, it is made alkaline by means of ammonium hydroxide and extracted with benzene. After the evaporation of the benzene, the residue is triturated with chloroform, the crystalline 3-hydroxy-N-methyl-morphinan is sucked off and washed with a little chloroform and acetone. After recrystallization from alcohol, the 3-hydroxy-N-methyl-morphinan has its melting point at 251–253° C. The hydrobromide melts at 193–195 C., the hydrochloride at 174–176 C. and the sulfate at 212–214° C.

*Example 2*

30 parts by weigh of 1-(p-hydroxy-benzyl)-2-methyl-1,2,3,4,5,6,7,8-octahydroisoquinoline obtained according to Example 1 are boiled under reflux for 8 hours in 300 parts by volume of 48 per cent hydrobromic acid. The reaction solution is dried in vacuo and the residue is dissolved in 30 parts by volume of absolute alcohol. Upon addition of the same volume of ether, 3-hydroxy-N-methyl-morphinan-hydrobromide begins to crystalize. Its melting point is 193–195° C. The free base melts at 251–253° C.

This application is a division of our copending application Serial No. 127,261, filed November 14, 1949, and now abandoned.

I claim:

1. A process which comprises nitrating 1-benzyl-2-methyl-1,2,3,4,5,6,7,8 - octahydroisoquinoline, thereby producing 1 - (p-nitro-benzyl)-2-methyl-1,2,3,4,5,6,7,8-octahydroisoquinoline; reducing the latter, thereby producing 1-(p-amino-benzyl)-2-methyl-1,2,3,4,5,6,7,8-octahydroisoquinoline; diazotizing the latter, thereby producing 1 - (p-hydroxy-benzyl)-2-methyl-1,2,3,4,5,6,7,8-tetrahydroisoquinoline; and heating the latter with an acid cyclizing agent, thereby producing 3-hydroxy-N-methyl-morphinan.

2. 1-(p-nitro-benzyl) - 2 - methyl-1,2,3,4,5,6,7,8-octahydroisoquinoline.

3. An acid addition salt of the compound of claim 2.

4. A nitric acid addition salt of the compound of claim 2.

5. A hydrobromic acid addition salt of the compound of claim 2.

6. An acid addition salt of 1-(p-amino-benzyl)-2-methyl-1,2,3,4,5,6,7,8-octahydroisoquinoline.

7. 1-(p-amino-benzyl) - 2 - methyl - 1,2,3,4,5,6,7,8-octahydroisoquinoline.

8. 1-(p-amino-benzyl) - 2 - methyl - 1,2,3,4,5,6,7,8-octahydroisoquinoline-hydrobromide.

9. A compound selected from the group consisting of 1-(p-nitro - benzyl) - 2 - methyl-1,2,3,4,5,6,7,8-octahydroisoquinoline and acid addition salts thereof.

10. A compound selected from the group consisting of 1-(p-amino-benzyl) - 2 - methyl-1,2,3,4,5,6,7,8-octahydroisoquinoline and acid addition salts thereof.

References Cited in the file of this patent

UNITED STATES PATENTS 2,524,855    Schnider et al. _____ Oct. 10, 1950

OTHER REFERENCES

Fieser et al., "Organic Chemistry" (D. C. Heath and Co.; Boston; 1944), page 620.

Sidgwick, "The Organic Chemistry of Nitrogen" (Oxford University Press; New York; 1942), page 404.